United States Patent [19]

Hanaoka

[11] Patent Number: 4,602,871
[45] Date of Patent: Jul. 29, 1986

[54] THERMISTOR THERMOMETER

[75] Inventor: Tadashi Hanaoka, Koganei, Japan

[73] Assignee: Citizen Watch Co., Ltd., Tokyo, Japan

[21] Appl. No.: 790,295

[22] Filed: Oct. 22, 1985

[30] Foreign Application Priority Data

Oct. 23, 1984 [JP] Japan .................................. 59-222735
Oct. 23, 1984 [JP] Japan .................................. 59-222736

[51] Int. Cl.$^4$ .......................... G01K 1/02; G01K 7/24
[52] U.S. Cl. ..................................... 374/102; 331/66; 364/571; 374/170; 374/171; 377/25
[58] Field of Search ............... 374/102, 103, 170, 171, 374/172; 331/66; 307/491; 377/25; 364/571

[56] References Cited

U.S. PATENT DOCUMENTS

| | | | |
|---|---|---|---|
| 3,287,975 | 11/1966 | Mason et al. | 331/66 X |
| 3,933,046 | 1/1976 | Ebrecht | 331/66 X |
| 4,453,835 | 6/1984 | Clawson et al. | 374/185 |
| 4,464,067 | 8/1984 | Hanaoka | 374/170 |
| 4,490,803 | 12/1984 | Briggs | 364/571 |
| 4,571,095 | 2/1986 | Stoffels | 374/183 X |

Primary Examiner—Daniel M. Yasich
Attorney, Agent, or Firm—Townsend and Townsend

[57] ABSTRACT

A thermistor thermometer has a reference resistance correcting section for controlling the number of pulses of an oscillation signal to a predetermined reference value. The oscillation signal is sampled in response to a measuring time signal at a reference temperature. The reference temperature is given as a predetermined temperature below a possible operating temperature range. The thermistor thermometer also has a sensitivity correcting section for operating the thermometer for first and second operating intervals at different counting rates. The first and second operating intervals constitute a sampling period of the measuring time signal. The first and second operating intervals of the sensitivity correcting section are switched over in response to a reference count signal from a temperature counter. The temperature counter counts the oscillation signals sampled in response to the measuring time signal and generates temperature data.

7 Claims, 28 Drawing Figures

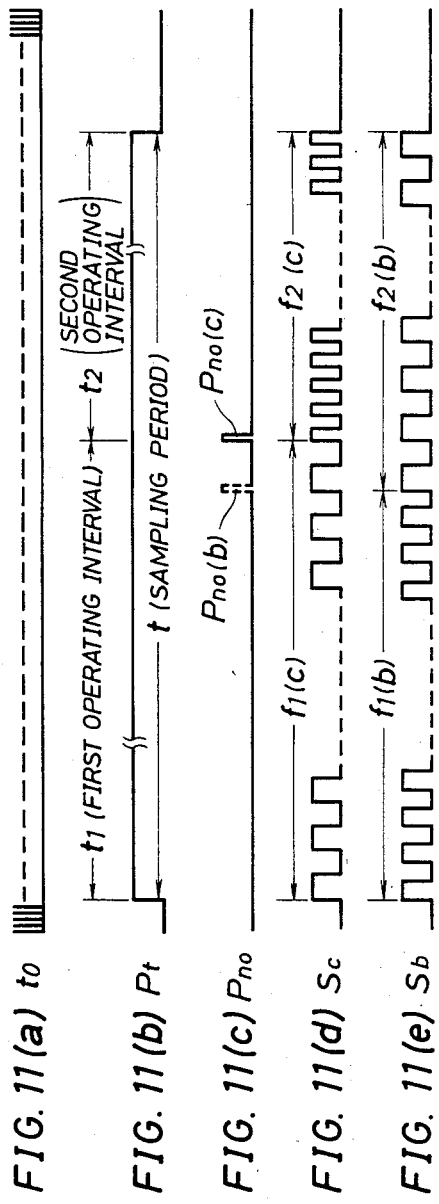

THERMISTOR THERMOMETER

BACKGROUND OF THE INVENTION

1. Field of the Invention

The present invention relates to a correcting means for correcting "variations" in reference resistance and constant of a thermistor as a temperature sensor in a thermometer to detect a temperature by an oscillation frequency of a temperature sensitive oscillator which is determined by a resistor of the thermistor.

2. Description of the Prior Art

Along with rapid advances in precision and stability of thermistors, thermistors have received a great deal of attention as temperature sensors in high-precision thermometers or clinical thermometers in recent years. When a thermistor is used as a temperature sensor in a thermometer and a clinical thermometer (these types of thermometers will be referred to as thermometers hereinafter), temperature sensitivity characteristics are determined by a reference resistance inherent to each thermistor and a thermistor constant (to be referred to as a B constant hereinafter). It is impossible to set the standard reference resistance and the standard B constant of an individual thermistor during the manufacture thereof from the viewpoint of industrial basis. Even if the thermistors of the identical standards are used, "variations" occur in the temperature sensitivity characteristics of the individual thermistors. As is well known, since the temperature sensitivity characteristic curve changes exponentially, it must be corrected linearly.

Thermistors are compact and inexpensive and can be easily handled as compared with other temperature measurement sensors. When the "variation" and "linear correction" problems are solved, they are suitable as temperature sensors of high precision and good stability since they can be manufactured as temperature sensors of a wide measurement range at low cost in mass production lines.

An arrangement and characteristics of a CR oscillator widespread and also used as a temperature sensitive oscillator of the present invention will be described with reference to FIG. 1.

FIG. 1 is a circuit diagram showing a typical example of the CR oscillator. Reference numeral 1 denotes a thermistor. A time constant circuit consisting of the thermistor 1 and a capacitor 6, and two CMOS inverters 7 and 8 constitute the CR oscillator. The CR oscillator converts to a change in oscillation frequency a change in resistance which is caused by a change in temperature of the thermistor 1.

In the CR oscillator described above, an oscillation frequency f is given as follows:

$$f = 1/2.2C0R \quad (1)$$

where C0 is the capacitance of the capacitor 6 and R is the resistance of the thermistor 1.

The resistance R of the thermistor at a temperature T(K) is derived below:

$$R = R0 \exp\{B(1/T - 1/T0)\} \quad (2)$$

where R0 is the resistance of the thermistor at a reference temperature T0(K) and B is the thermistor constant (the thermistor constant will be referred to as the B constant hereinafter) representing the sensitivity given by the temperature-resistance characteristics.

Substitution of equation (2) into equation (1) yields the following equation:

$$f = 1/[2.2C0R0 \exp\{B(1/T - 1/T0)\}] = \exp(B/T0)/\{2.2C0R0 \exp(B/T)\} \quad (3)$$

The number N of pulses generated from the CR oscillator for a unit time t is:

$$N = ft \quad (4)$$

Equations (3) and (4) yield the following equation:

$$T = B/\{(B/T0) - \ln(2.2C0R0N)/t\} \quad (5)$$

Equation (5) is used to calculate a temperature T upon detection of the number N of pulses from the CR oscillator during the time t.

The temperature sensitivity characteristic curve of the CR oscillator, changes in temperature sensitivity characteristic curve upon use of thermistors with different characteristics, and "linear correction" and "variation correction" of the temperature sensitivity characteristic curve will be described hereinafter.

FIG. 2 is a graph showing temperature sensitivity characteristic curves of thermistors. The pulse rate (N/t) of the oscillation signal f0 from the CR oscillator is plotted along the abscissa, and the temperature is plotted along the ordinate.

A curve a in FIG. 2 shows the standard temperature sensitivity characteristics of a thermistor thermometer using a thermistor having the rated B constant and a capacitor 6 having the rated capacitance C0. The standard temperature sensitivity characteristics are defined by equation (5). Curves b and c are obtained when thermistors have the standard resistance but B constants are deviated from the rated values, respectively.

As described above, the curve a of FIG. 2 simply represents the relationship given by equation (5). As is apparent from the curve a, equation (5) is a monotone increasing function. An ambient temperature of the thermistor 1 in the CR oscillator is solely determined by the number N of pulse signals for the predetermined time period t (measuring time).

The reason why linear correction is required in temperature measurement using the curve a will be described hereinafter.

In order to measure a temperature (to be described in detail later), the number N of pulses generated by the CR oscillator is counted by a counter. The counter can perform only linear incrementation, so that the count cannot be employed as the temperature data without modification. Counting must be performed on the basis of equation (5) to calculate the temperature T. As a result, an expensive operation circuit is required.

In order to realize an inexpensive thermistor thermometer, the number N of pulses from the CR oscillator must be counted by a counter having a counting characteristic approximating the curve a of FIG. 2, thereby obtaining the temperature T. For this purpose, a simple linearizing circuit is added to the counter to achieve linear correction, and the count of the counter must be used as direct temperature data. U.S. Pat. No. 4,464,067 issued to the present applicant describes a typical linearizing circuit of this type. The linearly corrected results are given by polygonal lines a1, b1 and c1 of FIG. 2 which respectively correspond to the curves a, b and c. The polygonal curves a1, b1 and c1 are obtained without performing variation correction (to be described later), so that their positions and slopes do not change since only linear correction is performed.

Variation correction of the thermistors will be described with reference to FIG. 3. As is apparent from equation (2), the temperature sensitivity characteristics of the thermistor depend on two characteristic constants inherent to the thermistor, i.e., the reference resistance R0 on the B constant B, as described above. The variations in the temperature sensitivity characteristics of the individual thermometers can be accurate when the reference resistance R0 and the B constant B of the individual thermistors used in thermistor thermometers are corrected during the fabrication of the thermistor thermometers.

The correction of the reference resistance R0 will be described first.

The temperature T in equation (5) does not change when a product of the reference resistance R0 and the capacitance C0 of the capacitor is predetermined. This indicates that an error (variation) from the standard resistance R0 can be corrected by adjusting the capacitance C0 of the capacitor. For this reason, in an embodiment to be described later, the capacitor 6 in the CR oscillator of FIG. 1 comprises a variable capacitor, and the capacitance C0 of the capacitor 6 is adjusted so as to correct "variations" in the reference resistance R0 of the thermistor 1. Alternatively, the resistance R0 and the capacitance C0 are fixed, and the time t in equation (5) is adjusted. Therefore, the industrial "variations" in the capacitance C0 in the capacitor 6 in the CR oscillator and "variations" in the reference resistance R0 of the thermistor 1 can be simultaneously adjusted.

Polygonal lines b2 and c2 as the result of correction of the reference resistances are shown in FIG. 3, so that the polygonal lines b1 and b2 of FIG. 2 are shifted by ΔR1 and ΔR2, respectively, thereby correcting them to have the pulse number N0 equal to the polygonal line a1 of the reference temperature sensitivity characteristics at the reference temperature T0.

The principle of correction of "variations" in B constant will be described hereinafter.

When the "variation" error of the B constant of the thermistor 1 is $\Delta(-1<<\Delta<<1)$ and is used as the oscillation frequency variable element, the relationship between the number N of pulses and the temperature is expressed by equation (5):

$$T = B(1+\Delta)/\{B(1+\Delta)/T0 - \ln(2.2C0R0/t)N\} \qquad (6)$$

Assume that the "variations" in the reference resistance R0 have corrected in accordance with the method as described above and that linear correction has already been performed. Equation (6) varies in accordance with different individual thermistors and presents polygonal lines such as lines b2 and c2, the slopes of which are different due to the different B constants of the individual thermistors from the polygonal line a1 of the standard temperature sensitivity characteristics. The polygonal line b2 is obtained when the error Δ of the B constant is positive, while the polygonal line c2 is obtained when the error Δ is negative.

As described with reference to the curve a of FIG. 2 and the polygonal line a1 of FIG. 3, when the counter is provided with the characteristics of the graph of polygonal line, the curve a can be approximated by the polygonal line to a straight line. However, even if output pulses from the CR oscillator having the temperature sensitivity characteristics given by the line b2 or c2 of FIG. 3 are counted, counts at the respective temperatures excluding the reference temperature T0 differ from each other due to different slopes caused by different B constants of the thermistors. For this reason, the different thermistors show different temperatures although an identical temperature is measured. As a result, variations in B constants, i.e., variations in sensitivity of the thermistors occur.

There are a few conventional techniques for correcting the variations in sensitivity. According to a first technique, a series- and parallel-connected resistor array is connected to the thermistor (to be described later), and the sensitivity is corrected in an analog manner. According to a second technique, sensitivity is corrected by arithmetic operations in accordance with the correction data. A third technique is proposed by the present applicant in U.S. Pat. No. 4,453,834. According to the third technique, sensitivity is digitally corrected with a variable frequency by a preset counter. U.S. Pat. No. 4,453,834 describes an arrangement using an IC sensor as a temperature sensor with linear characteristics. The B constant correction (i.e., sensitivity correction) results are represented by polygonal lines b3 and c3 of FIG. 3. By correcting the angles θ1 and θ2 of the polygonal lines b2 and c2 with respect to the polygonal line a1 having the reference temperature sensitivity characteristics, the characteristics represented by the polygonal lines a1, b3 and c3 are rendered identical.

As described above, in order to manufacture thermistor thermometers with high productivity at low cost, different characteristics of the thermistors are matched by variation correction with the reference temperature sensitivity characteristics, and a counter having the linear characteristics is used.

The following conventional techniques can be proposed to perform variation and linear correction of the thermistor in the conventional thermistor thermometer:

(1) A series- and parallel-connected resistor array 2 is connected to the thermistor 1, as shown in FIG. 4. The resistance of the resistors R1 to R4 constituting the resistor array 2 are selectively adjusted in association with the temperature sensitive resistance of the thermistor 1. The temperature sensitivity curve of the thermistor 1 is changed to simultaneously perform linear and sensitivity correction. Reference resistance correction is performed by adjustment of the oscillating capacitor C0 or digital processing.

(2) As shown in FIG. 5, a resistance of the thermistor 1 is converted by an A/D converting means 3 to digital data. The digital data is fetched by a microprocessor 4. Corrected digital data is also fetched by the microcomputer 4 through a data setting means 5. The digital data corresponding to the resistance of the thermistor 1 from the A/D converting means 3 is subjected to one or both of linear and sensitivity correction operations, thereby obtaining the temperature data. The corrected digital data is prepared as data for standardizing the temperature sensitivity characteristics of the specific thermistor 1 in association with the temperature sensitivity characteristics.

Reference resistance correction is the same as technique (1).

(3) As described in U.S. Pat. No. 4,453,834, sensitivity correction is digitally performed by a variable frequency divider (in the case of U.S. Pat. No. 4,453,834, linear correction need not be performed since the temperature sensor has linear characteristics).

In technique (1), it is very difficult to adjust the resistances of the resistors R1 to R4 for providing predetermined temperature sensitivity characteristics. In addition, adjustment is cumbersome and time-consuming, resulting in low productivity. In spite of such difficulties, ideal characteristics cannot be obtained due to an irregular characteristic curve. Sufficient correction precision for a thermometer cannot be obtained. In addition, when thermometers are automatically manufactured, a compact lightweight thermometer cannot be achieved due to a complex circuit arrangement. As a result, a handy thermistor thermometer at low cost cannot be easily manufactured.

In technique (2), correction precision is satisfactory. However, the microcomputer and the A/D converting means are required, so that the thermometer device as a whole becomes large and expensive. Therefore, it is difficult to realize a handy, inexpensive thermometer.

In technique (3), correction precision is better than that in technique (1), and the arrangement is simpler and the price is lower than those in technique (2). Technique (3) is most suitable for achieving an inexpensive compact thermistor thermometer. However, "variation" correction of the temperature sensitivity characteristics of the thermistor in technique (3) presents the following problem.

In a conventional thermometer based on technique (3), reference resistance correction and sensitivity correction are independently performed.

The method of correcting variations in sensitivity in technique (3) will be described with reference to FIG. 6. When a thermistor having a temperature sensitivity characteristic curve d in FIG. 6 is corrected to provide the reference temperature sensitivity characteristic curve a, reference resistance correction is performed at the reference temperature T0 as the central temperature (37° C. in the clinical thermometer) of the possible operating temperature range. As indicated by a curve d1, the reference temperature is matched with the number N0 of the pulses. Sequentially, by performing digital sensitivity correction by using a variable frequency, the curve d1 is shifted to a curve d2 having the same slope as that of the curve a. In this case, the curve d2 is found to be given such that the pulse number corresponding to the reference resistance is shifted from N0 to Nd. In this manner, when digital sensitivity correction is performed throughout the temperature sensitivity characteristic curve of the thermistor, reference resistance correction influences sensitivity correction. Therefore, two types of correction must be alternately repeated, and adjustment is complex.

SUMMARY OF THE INVENTION

It is an object of the present invention to provide a thermistor thermometer wherein the above-mentioned technique (3) is adapted as a technique for obtaining the most inexpensive compact thermistor thermometer, and correction operation for "variations" in the thermistor can be simplified unlike in technique (3).

In order to achieve the above object of the present invention, there is provided a thermometer having a temperature sensitive oscillator with a variable oscillation frequency which changes in response to a change in resistance of a thermistor, a measuring time signal generator for generating a measuring time signal for sampling and outputting the oscillation signal from the temperature sensitive oscillator, a temperature counter for counting oscillation pulses sampled by the measuring time signal and generating temperature data, a display driver for converting the temperature data to a display signal, and a display device for displaying a temperature in accordance with the display signal, wherein there are provided reference resistance correcting means for controlling to a predetermined reference value the number of oscillation pulses sampled by the measuring time signal at a reference temperature, the reference temperature being given as a constant temperature below a possible operating temperature range, and sensitivity correcting means for causing the thermometer to operate with different counting rates during first and second operating intervals constituting the sampling period of the measuring time signal, switching between the first and second operating intervals of the sensitivity correcting means being controlled in response to a reference count signal.

BRIEF DESCRIPTION OF THE DRAWINGS

FIGS. 11(a) and 11(e) are respectively timing charts for explaining the operation of the thermistor thermometers of the present invention;

DETAILED DESCRIPTION OF THE PREFERRED EMBODIMENTS

The basic operations of the thermistor thermometer of the present invention will be described with reference to the basic arrangement of a thermistor thermometer of FIG. 7 and a graph showing the temperature sensitivity characteristics of FIG. 12.

Figure 1:
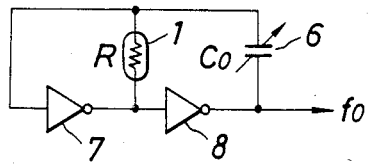
FIG. 1 is a block diagram showing an example of the basic arrangement of a conventional thermistor CR oscillator.
Figure 7:
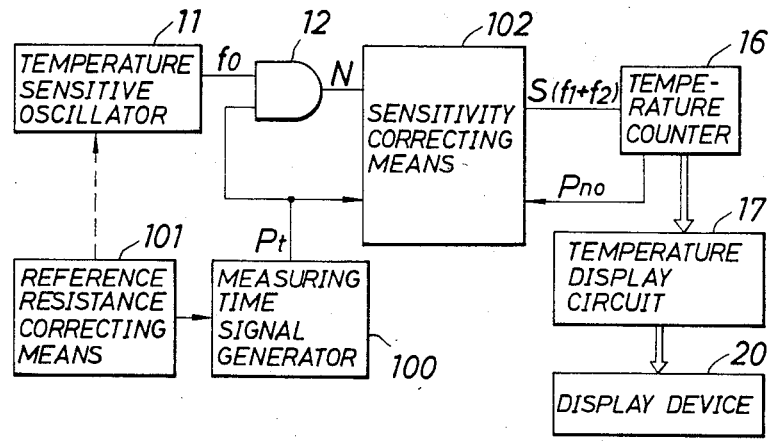
FIG. 7 is a block diagram showing the basic configuration of a thermistor thermometer according to the present invention.

A temperature sensitive oscillator 11 of FIG. 7 is the same as that of the thermistor RC oscillator of FIG. 1. A time constant of a time constant circuit consisting of a thermistor 1 and a capacitor 6 determines an oscillation frequency of the oscillator 11. An oscillation frequency f0 changes in accordance with a change in resistance of the thermistor 1. Reference numeral 12 denotes an AND gate which receives as a gate signal a measuring time signal Pt generated by a measuring time signal generator 100. The oscillation signal f0 from the temperature sensitive oscillator 11 is supplied as an output pulse signal N to a sensitivity correcting means 102 for a gate signal period. The sensitivity correcting means 102 receives as control signals the measuring time signal Pt and a reference count signal Pn0 (to be described later) and divides the sampling period t of the measuring time signal Pt into first and second operating intervals t1 and t2. The means 102 generates different count rate output signals f1 and f2 during the first and second operating intervals t1 and t2, respectively. A sum of the signals f1 and f2 constitute a counting signal S. Reference numeral 16 denotes a temperature counter having a linear function. The temperature counter 16 linearizes the output signals f1 and f2 from the sensitivity correction means 102 and counts them to generate temperature data. When the counter has reached the reference value N0 (a count S0) corresponding to the reference temperature T0, the counter 16 applies a reference count signal Pn0 to the sensitivity correcting means 102. Reference numeral 101 denotes a reference resistance correcting means for setting to the predetermined reference value N0 the number of pulses of the oscillation signal sampled in response to the measuring time signal Pt at the reference temperature T0. In the arrangement of this embodiment, as indicated by the solid line, the measuring time signal generator 100 is controlled to control the pulse width of the measuring time signal Pt. However, as indicated by the broken line, the oscillation frequency of the temperature oscillator 11 may be controlled by a variable capacitor, as previously described. Reference numeral 17 denotes a temperature display circuit which causes a display device 20 to display the temperature data from the temperature counter 16.

The operation of the above-mentioned thermistor thermometer as a clinical thermometer will be described with reference to the temperature sensitivity characteristic curves of FIG. 12.

Figure 12:
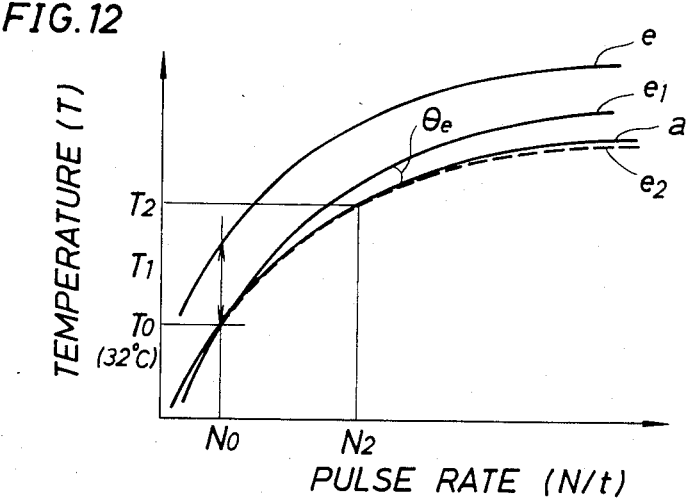
FIGS. 12, 13 and 14 are graphs showing temperature sensitivity characteristics of thermistor thermometers of the present invention, respectively.

As shown in FIG. 12, the reference temperature sensitivity characteristics of the thermistor are represented by a curve a, and those of a thermistor actually built into the temperature sensitive oscillator 11 are represented by a curve e. When the thermistor thermometer is used as a clinical thermometer, the possible operating temperature range can be 32° C. to 45° C., and the temperature of 32° C. as the lower limit is defined as the reference temperature T0. Under these conditions, the thermistor thermometer is set in a 32° C. thermostat having the reference temperature, and the temperature sensitive oscillator 11 is oscillated at the temperature of 32° C. The reference resistance correcting means 101 is adjusted such that the count of the temperature counter 16 is set to be a count S0 corresponding to the reference value N0 determined by the reference temperature sensitivity characteristic curve a, thereby determining a pulse width t of the measuring time signal Pt. The above operation is correction operation of the reference resistance. As shown in FIG. 12, the curve e is shifted to a curve e1 which crosses the curve a. However, since sensitivity correction is not performed yet, the curve e1 has an angle of e with respect to the curve a. Subsequently, sensitivity correction is performed such that predetermined correction data is stored in the sensitivity correcting means 102 in accordance with an angle e between the curves a and e1. A difference between count rates of the sensitivity uncorrected output signal f1 and the sensitivity corrected output signal f2 from the sensitivity correction means 102 serves as a sensitivity correction value supplied to the thermistor incorporated in the temperature sensitive oscillator 11. The sensitivity correction value varies in accordance with individual thermistors. When sensitivity correction is performed, the curve e1 is shifted to a curve e2 of FIG. 12. The curve e2 does not match with the curve a below the temperature range lower than the temperature of 32° C. as the reference temperature. However, the curves a and e2 match with each other at the temperature of 32° C. In the range above 32° C., these curves have the identical slope within the possible operating temperature range.

The operation of the thermistor thermometer having the variation corrected thermistor at 32° C. and the operation thereof at a temperature above 32° C. will be described below.

When the thermistor thermometer is operated at 32° C., the oscillation output f0(32) from the temperature sensitive oscillator 11 and the noncorrected output signal f1(32) from the sensitivity correcting means 102 have low frequencies in the low temperature operating range of the thermometer. The temperature counter 16 starts counting in response to the output signal f1(32). As described with reference to the correction of the reference resistance, since the pulse width t of the measuring time signal Pt is determined such that the count of the counter 16 is S0 (pulse number N0) at 32° C., a single sampling cycle by the measuring time signal Pt is ended when the count of the temperature counter 16 reaches S0. Therefore, correction is not performed by the sensitivity correcting means, and the sampling period t is the same as the single operating interval of f1(32).

Referring to FIG. 12, the thermistor thermometer is operated until the pulse number is given as N0 of the curve e2. Counting is performed at sensitivity (the B constant inherent to the thermistor incorporated in the temperature sensitive oscillator 11) different from that given by the curve a.

The operation of the thermistor thermometer at a temperature T2 above 32° C. will be described hereinafter.

When the thermistor thermometer is operated at the temperature T2, an oscillation output f0(T2) from the temperature sensitive oscillator 11 and an output signal f1(T2) from the sensitivity correcting means 102 have higher frequencies than those of the outputs f0(32) and f1(32) at 32° C., respectively. The temperature counter 16 is started in response to the output signal f1(T2). The same operation as that at 32° C. is performed until the count reaches S0. However, when the count of the counter 16 reaches S0, the counter 16 supplies a reference value count signal Pn0 to the sensitivity correcting means 102 which is then operated to switch the output signal from f1(T2) to f2(T2). As a result, the temperature counter 16 is operated in response to the signal f2(T2) after the count S0 (the pulse number N0). When the count reaches the pulse number N2, one sampling cycle is completed.

In operation at a temperature above 32° C. (T0), the sampling period is divided by the measuring time signal Pt into a first interval for which the temperature counter 16 is operated in response to the output signal f1 and a second interval for which the temperature counter 16 is operated in response to the signal f2. The first and second operating intervals are switched over in response to the reference count signal Pn0 from the temperature counter 16.

The above operation is described with reference to FIG. 12. The thermistor thermometer is operated in response to the signal f1(T2) in accordance with the B constant inherent to the thermistor in the same manner as at 32° C. for the first operating interval between starting of measurement and time corresponding to the pulse number N0. The thermistor thermometer is operated in response to the sensitivity corrected signal f2(T2) for the second operating interval between the number N0 and the number N2 in accordance with the same sensitivity characteristics as in the curve a.

With the arrangement of the present invention, by separating the counting operation until the pulse number N0 from counting operation after N0 as well as sensitivity correction for the temperature range above the reference temperature T0, two types of correction, i.e., reference resistance correction from the sensitivity correction concerning variations in thermistor are separated, thereby simplifying correction operations.

Since sensitivity correction is not performed for the temperature range below the reference temperature T0, errors occur in the measured temperatures. However, since the reference temperature T0 is set to be near the lower value of the possible temperature range, the values subjected to errors can be eliminated.

Figure 8:
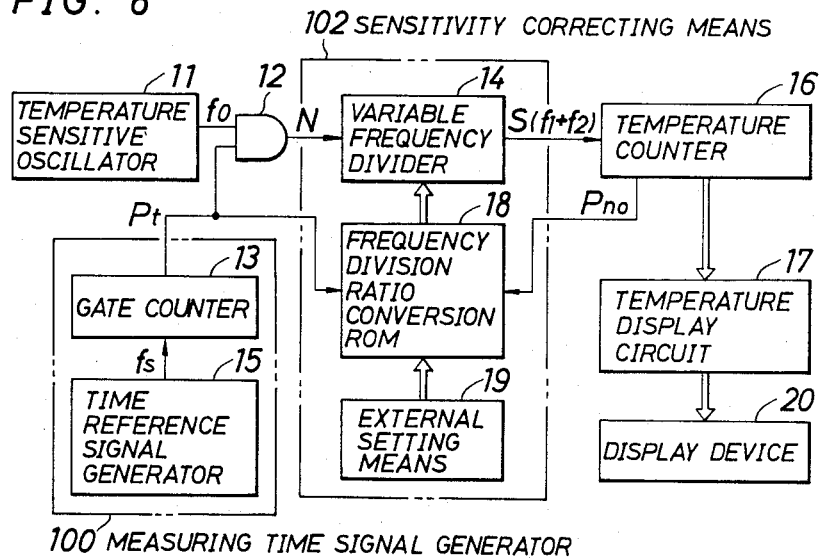
FIGS. 8, 9 and 10 are block diagrams of thermistor thermometers according to embodiments of the present invention, respectively.

FIG. 8 is a block diagram showing an embodiment of the present invention. The same reference numerals as in FIG. 8 denote the same parts as in FIG. 7, and a detailed description thereof will be omitted.

A measuring time signal generator 100 comprises a reference time signal generator 15 and a gate counter 13 for dividing the frequency of a reference pulse signal fs generated by the generator 15 and generating a measuring time signal Pt. A sensitivity correcting means 102 comprises a variable frequency divider 14 for dividing the frequency of the output pulse signal from a temperature sensitive oscillator 11, a frequency division ratio conversion read-only memory (to be referred to as a frequency division ratio conversion ROM hereinafter) for converting a frequency division ratio of the variable frequency divider 14 in accordance with the measuring time signal Pt and the reference count signal Pn0 from the temperature counter 16, and an external setting means 19 for setting sensitivity correction data in accordance with the B constant of the thermistor which is built into the temperature sensitive oscillator 11. The reference resistance correction means 101 is arranged to adjust a variable capacitor in the temperature sensitive oscillator 11.

The operation of the thermistor thermometer having the arrangement described above will be described with reference to temperature sensitivity graphs of FIGS. 13 and 14 and the timing charts of FIGS. 11(a) to 11(e).

The operation will be described for a thermistor thermometer having a thermistor of sensitivity deviated in the positive direction and given by a curve b with respect to the reference temperature sensitivity curve a and a thermistor thermometer having a thermistor of sensitivity deviated in the negative direction and given by a curve c.

In order to correct the reference resistance, the thermistor thermometers is kept in an atmosphere at the reference temperature T0, as previously described. Under this condition, the variable capacitors in the respective thermistor thermometers are adjusted to match the count of the temperature counter 16 with S0 (the pulse number N0). During correction of the reference resistance, the variable frequency divider 14 cannot be controlled by the frequency division ratio conversion ROM 18 and is operated at the reference frequency division ratio. In order to perform sensitivity correction, a frequency division ratio variable corresponding to deviations and their directions (i.e., deviations θ1 and θ2 and their directions) of sensitivities given by the curves b and c with respect to the curve a are set by the external setting means 19 in the frequency division ratio conversion ROM 18. The set frequency division ratio is small in the curve b of high sensitivity with respect to the curve a, but is large in the curve c of low sensitivity with respect to the curve a.

The detailed operation of the thermistor thermometers will be described with reference to FIGS. 14 and 11(a) to 11(e). FIG. 14 shows polygonal lines a1, b1 and c1 obtained by linearly approximating the curves a, b and c of FIG. 13 by a linearizing circuit arranged in the temperature counter 16. The pulse rate (N/t) of the pulses sampled by the measuring time signal Pt is plotted along the abscissa, and the counts S of equal temperature interval differences of the counter 16 are plotted along the ordinate. Values S0 to S4 correspond to the equal interval difference temperatures T0 to T4, respectively.

In a technique for correcting the sensitivity according to the present invention, the frequency division ratio of the variable frequency divider 14 is controlled so as to obtain an identical value of the counts S at the identical temperature with respect to the polygonal lines a1, b1 and c1. For example, the respective frequency division ratio conversion ROMs are set such that the pulse number Nb of the polygonal line b1 corresponding to the temperature T1 is equal to the pulse number Nc of the polygonal line c1. In other words, in the case of the polygonal line b1, when the number of input pulses supplied to the variable frequency divider 14 is set to be Nb, the number of output pulses therefrom is set to be S1. In the case of the polygonal line c1, when the number of input pulses supplied to the variable frequency divider 14 is set to be Nc, the frequency division ratio is set such that the number of output pulses from the variable frequency divider 14 is set to be S1. As a result, the polygonal lines b1 and c1 match with the polygonal line a1.

The sensitivity correction will be described in more detail with reference to the timing charts of FIGS. 11(a) to 11(d). FIG. 11(a) shows the oscillation signal f0 from the temperature sensitive oscillator 11. Different oscillation signals f0 have different frequencies. FIG. 11(b) shows the measuring time signal Pt, and its measuring period t is divided into the first and second operating intervals t1 and t2. Switching between the first and second operating intervals t1 and t2 is controlled in response to the reference count signal Pn0 shown in FIG. 11(c).

FIGS. 11(d) and 11(e) show output pulse signals S(f1+f2) from the variable frequency divider 14. FIG. 11(d) shows the signal corresponding to the polygonal line c1 of FIG. 14, so that the second operating interval t2 is subjected to operation at a frequency division ratio smaller than the reference frequency division ratio, as compared with the first operating interval t1 subjected to operation at the reference frequency division ratio. The measuring time signal Pt shown in FIG. 11(b) has a waveform corresponding to the polygonal line c1. The first and second operating intervals t1 and t2 are controlled by the reference count signal Pn0(c) on the polygonal line c1. FIG. 11(e) shows the signal corresponding to the polygonal line b1 of FIG. 14. The second operating interval t2 is subjected to operation at a ratio larger than the reference frequency division ratio, as compared with the first operating interval t1 subjected to operation at the reference frequency division ratio. The signal frequency f1(b) of the polygonal line b1 at the reference frequency division ratio has a higher frequency than that of f1(c) of the polygonal line c1, so that the reference count signal Pn0(b) is generated earlier than Pn0(c) of the polygonal line c1 as shown in FIG. 11(c). At this time, switching between the first and second operating intervals t1 and t2 is performed. The output pulse signals Sc[f1(c)+f2(c)] and Sb[f1(b)+f2(b)] shown in FIGS. 11(d) and 11(e) have the same pulse number at the identical temperature.

In the circuit of FIG. 8, the measuring time signal Pt is generated by the measuring time signal generator 100, and the AND gate 12 is turned on thereby. At the same time, the frequency division ratio conversion ROM 18 is initialized to set the variable frequency divider 14 to be the reference frequency division ratio. The output pulse signal N from the AND gate 12 gating the oscillation signal f0 from the temperature sensitive oscillator 11 is reference divided by the variable frequency divider 14, as shown in FIG. 11(d) or 11(e). The output pulse signal f1 is linearized by the temperature counter 16, so that the counter 16 is started. When the count of the temperature counter 16 has reached S0 corresponding to the reference value N0, the reference count signal Pn0 is generated, and the frequency division ratio conversion ROM 18 is switched to the correction value setting state, so that the variable frequency divider 14 changes the set frequency division ratio. As a result, the variable frequency divider 14 is switched to the second operating interval, as shown in FIG. 11(d) or (e), and the output pulse signal f2 having a count rate different from that of the pulse signal f1 is generated in accordance with the set frequency division ratio, thereby performing sensitivity correction. The above-mentioned sensitivity correction is performed for all counts including the counts S2, S3 and S4 of FIG. 14. The polygonal lines b1 and c1 completely match with the polygonal line a1. As shown in FIG. 11(b), when the measuring time signal Pt is disabled, the AND gate 12 is disabled to complete one measuring cycle. At this time, the count of the temperature counter 16 is displayed on a display device 20 through a temperature display circuit 17.

Figure 9:
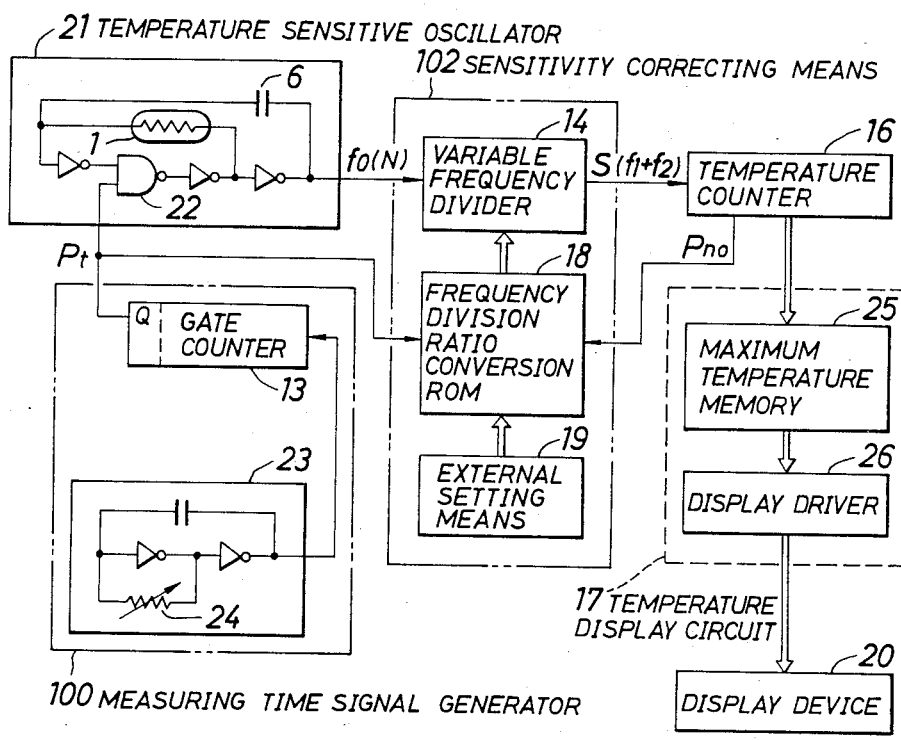

FIG. 9 is a block diagram showing another embodiment of the present invention. In this embodiment, a NAND gate 22 in place of the AND gate 12 of FIG. 8 is arranged in a temperature sensitive oscillator 21. A measuring time signal from a gate counter 13 is used as a gate signal of the NAND gate 22 which is then enabled, so that the oscillator 21 can be operated only for the measuring time signal interval. More particularly, the oscillation period is changed in correspondence with the measuring time signal period t to control the number of pulses supplied from the temperature sensitive oscillator 21 to the temperature counter 16, thereby obtaining the counting characteristics represented by a1, b1 or c1 of FIG. 14. In this manner, when the temperature sensitive oscillator 21 is operated only for the necessary measuring time, the driving power of the oscillator 21 can be greatly saved. For example, when the thermometer is operated with a compact dry cell, the above arrangement can be conveniently used.

In the embodiment described above, a means for varying the oscillation frequency is included as a reference resistance correcting means 101 in a time reference signal generator 23. For example, the time reference signal generator 23 is constituted by a CR oscillator, and a variable resistor is used as the oscillation frequency varying means in a time constant circuit for determining the oscillation frequency. The variable resistance 24 is operated to adjust the frequency of the reference signal supplied from the time reference signal generator 23 to the gate counter 13.

Since the frequency of the reference signal is adjusted, the interval of the measuring time signal Pt from the gate counter 13 is variable. The output pulse signal supplied from the temperature sensitive oscillator 21 to the temperature counter 16 can be adjusted to have a predetermined frequency. This arrangement is advantageous in mass production so as to correct "variations" in temperature sensitivity characteristics based on different reference resistances of the thermistor as described with reference to FIG. 3 since the variable resistor is used. As compared with the case of the variable capacitor of FIG. 2, the circuit arrangement and adjustment can be simplified.

The temperature display circuit 17 has a known circuit arrangement consisting of a maximum temperature memory 25 and a display driver 26.

Figure 10:
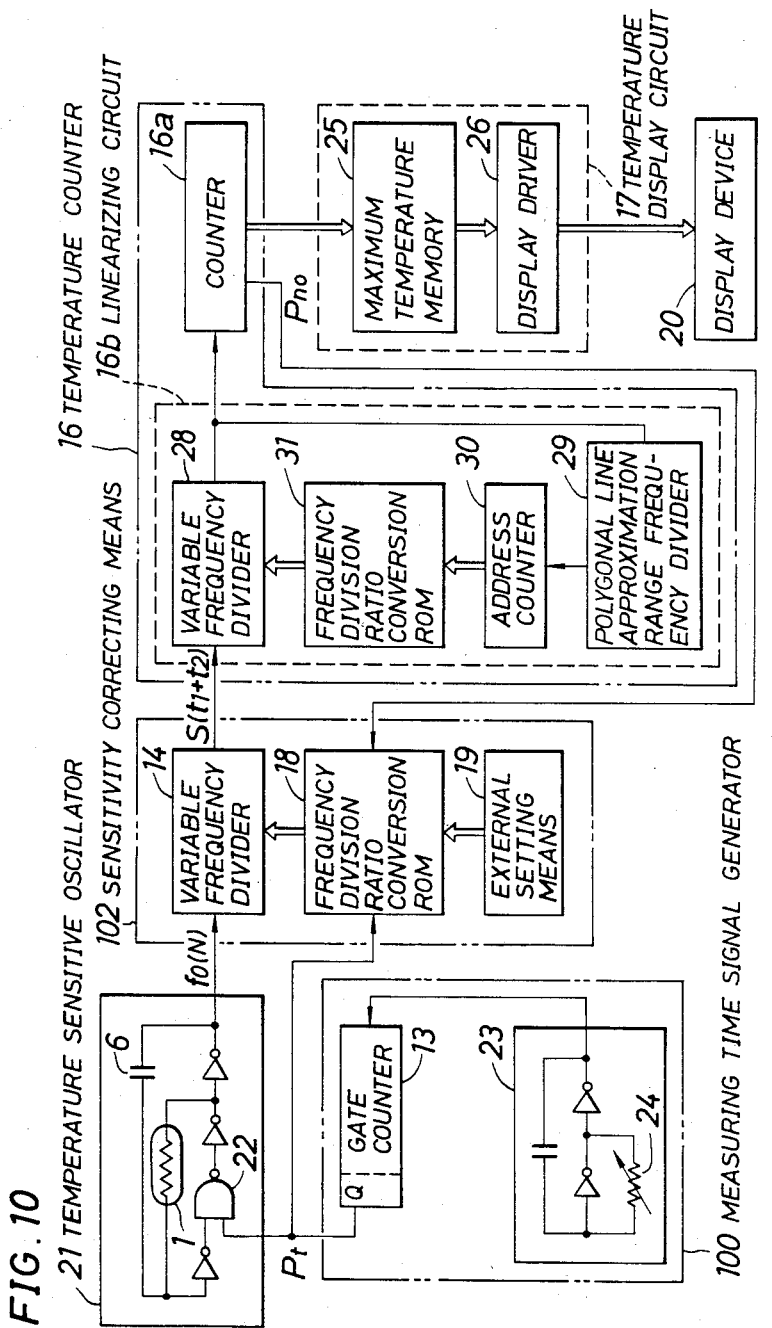

FIG. 10 is a block diagram showing still another embodiment in which a linearizing circuit is added to the arrangement of FIG. 9.

In this embodiment, the temperature counter 16 comprises a counter 16a and a linearizing circuit 16b. The output pulse signal f0 from a temperature sensitive oscillator 21 is supplied to the counter 16a through the linearizing circuit 16b. The temperature sensitivity characteristics of the oscillator 21 can be linearized by the linearizing circuit 16b for performing linear approximation. Temperature measurement precision can be improved in accordance with correction of the "variations" based on the different types of thermistors.

The linearizing circuit 16b is arranged in accordance with a technique described in detail in U.S. Pat. No. 4,464,067 issued to the present applicant.

The linearizing circuit 16b is inserted between the counter 16a and a variable frequency divider 14 constituting the sensitivity correcting means 102. The circuit 16b comprises a variable frequency divider 28 for dividing the output pulse signal S from the variable frequency divider 14, a polygonal line approximation range frequency divider 29 for dividing the frequency of the frequency-divided pulse signal supplied from the variable frequency divider 28 to the counter 16a, an address counter 30 for counting outputs from the frequency divider 29, and a frequency division ratio conversion ROM 31 for controlling a frequency division ratio of the variable frequency divider 28 so as to obtain a frequency division ratio corresponding to the count in accordance with a preset program.

The operation of the linearizing circuit 16b is described in detail in U.S. Pat. No. 4,464,067, and its operation will only be briefly described below.

Figure 2:
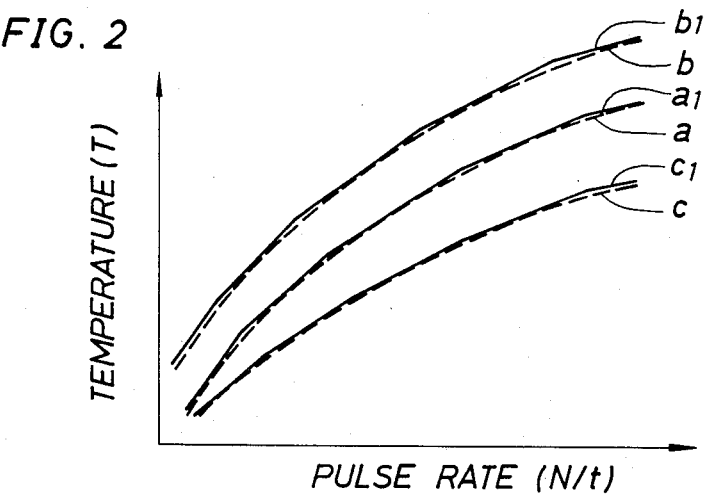
FIGS. 2 and 3 are respectively graphs showing temperature sensitivity characteristics of a thermistor thermometer.
Figure 3:
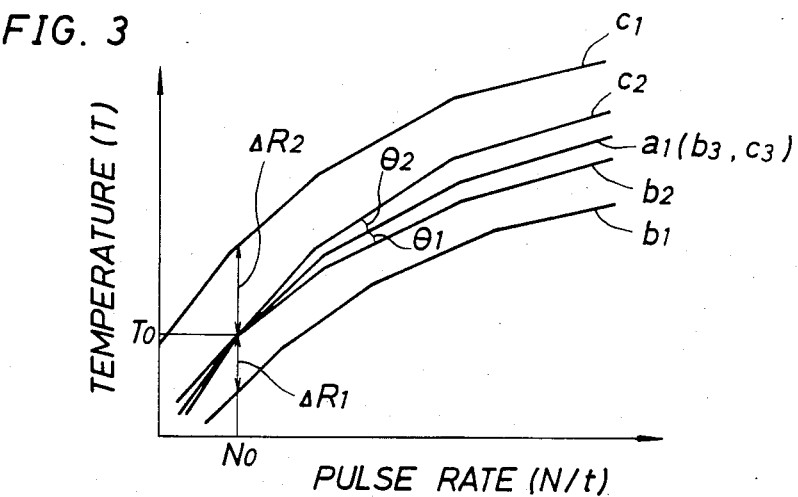

The output pulse number n for the unit measuring time t from the temperature sensitive oscillator 21 does not linearly change with respect to the temperature T, as described with reference to FIG. 2. The sensitivity is degraded when the temperature T is increased. In order to improve the measuring precision, the characteristics must be linearized. An output from the temperature sensitive oscillator 21 is frequency-divided by the variable frequency divider 28 in the counter 16b, and the frequency-divided signal is supplied to the polygonal line approximation range frequency divider 29. The frequency divider 29 generates input pulses only by one for every temperature interval difference in accordance with the characteristics associated with the B constant of the thermistor 1 in the temperature sensitive oscillator 21. When the B constant characteristics of the thermistor 1 is given by the curve a of FIG. 13, pulses are generated for T0, T1, T2, ..., respectively, and are counted by the address counter 30. In this manner, the count is used as an address signal to access the proper data from the ROM 31, and the frequency division ratio data corresponding to the address signal is read out, thereby converting the frequency division ratio of the variable frequency division 28. A temperature vs. count characteristic curve is linearized, so that the count characteristics of FIG. 14 are linearized by approximation.

Other operations are the same as those of the previous embodiments, and a description thereof will be omitted.

When the linearly approximated output pulse f0 from the temperature sensitive oscillator 21 is supplied to the counter 16a and is displayed, the number of output pulses is proportional to the temperature. Therefore, measurement precision can be further improved in addition to the temperature sensitivity correction effect.

Figure 15:
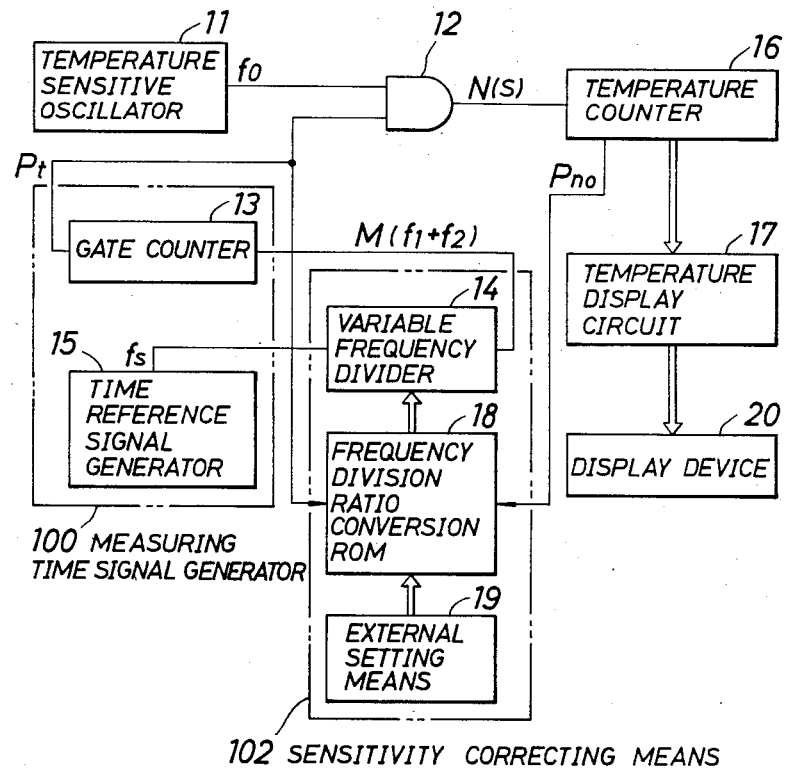
FIG. 15 is a block diagram of a thermistor thermometer according to still another embodiment of the present invention.

FIG. 15 is a block diagram showing still another embodiment of the present invention. Unlike in the embodiment of FIG. 2 wherein the sensitivity correcting means 102 is inserted between the temperature sensitive oscillator 11 and the temperature counter 16 to vary the frequency of the oscillation signal f0 from the temperature sensitive oscillator 11, a sensitivity correcting means 102 is arranged between a time reference signal generator 15 and a gate counter 13 to vary a frequency fs from the time reference signal generator 15, thus varying the period of the measuring time signal Pt.

"Variation" correction of the thermistor thermometer having the arrangement described above will be described with reference to the graphs of FIGS. 13 and 14 and the timing charts of FIGS. 16(a) to 16(h).

Figure 13:
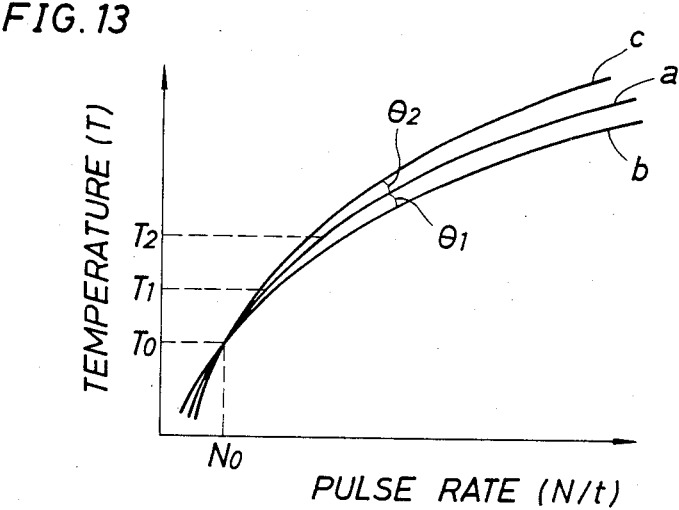

In the same manner as in the previous embodiments, thermistors having the temperature sensitivity characteristics given by the curves b and c of FIG. 13 matches with the reference characteristic curve a. In order to perform reference resistance correction, the thermistor thermometers are kept in an atmosphere at the reference temperature T0, and the variable frequency divider 14 in the sensitivity correcting means 102 is held at the frequency frequency division ratio. In this state, reference resistance correcting means such as a variable capacitor in the temperature sensitive oscillator 11 and a variable resistor in the time reference signal generator 15 are adjusted to match the count of a temperature counter 16 with a reference count S0. Therefore, a frequency of the reference pulse signal fs from the time reference signal generator 15 and a pulse number N0 at the reference temperature T0 are determined.

In order to perform sensitivity correction, a frequency division ratio variable is set by an external setting means 19 in a frequency division ratio conversion ROM 18 in accordance with deviations and their directions (i.e., deviations θ1 and θ2 and their directions) of the curves b and c with respect to the reference temperature sensitivity characteristic curve a. The set frequency division ratio is small for the curve b of high sensitivity with respect to the curve a and is large for the curve c of low sensitivity with respect to the curve a.

The operation of the arrangement described above will be described with reference to FIG. 14 and FIGS. 16(a) to 16(h).

Figure 16:
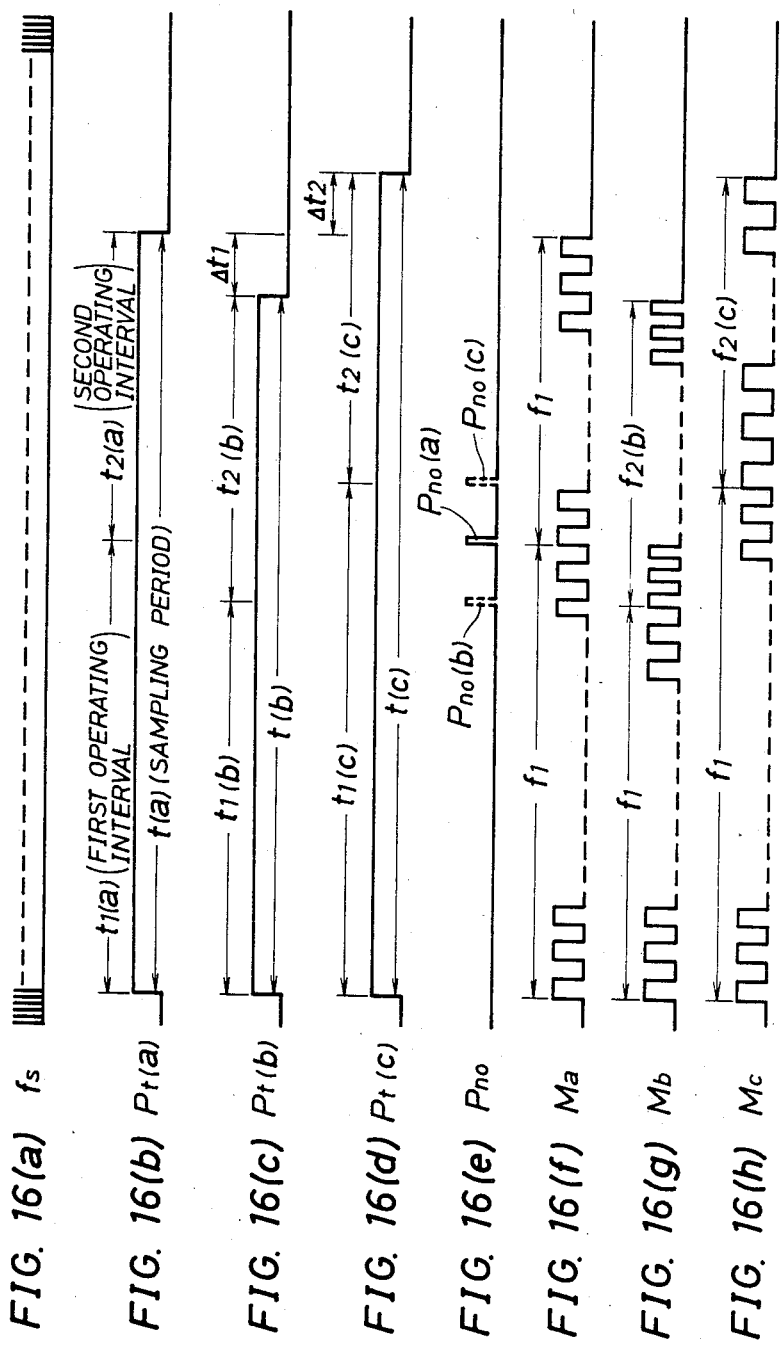
FIGS. 16(a) to 16(h) are respectively timing charts for explaining the operation of the thermistor thermometer of FIG. 15.

FIG. 16(a) shows the reference pulse signal fs from the time reference signal generator 15. After reference resistance correction is performed, the reference pulse signal fs has a predetermined frequency. FIGS. 16(b), 16(c) and 16(d) show measuring time signals Pt(a), Pt(b) and Pt(c) corresponding to the polygonal lines a1, b1 and c1, respectively. These signals have different sampling periods t(a), t(b) and t(c), respectively. Each sampling period is divided into first and second operating intervals t1 and t2. FIG. 16(e) shows the reference count signal Pn0. The reference count signals Pn0(a), Pn0(b) and Pn0(c) corresponding to the polygonal lines a1, b1 and c1 control switching between the first and second operating intervals t1 and t2 of the measuring time signals Pt(a), Pt(b) and Pt(c) respectively shown in FIGS. 16(b), 16(c) and 16(d).

FIGS. 16(f), 16(g) and 16(h) respectively show output pulse signals M(f1+f2) from the variable frequency divider 14. FIG. 16(f) shows an output pulse signal Ma corresponding to the polygonal line a1. The first and second operating intervals of the signal Ma are subjected to operation at the frequency f1 based on the reference frequency division ratio from the variable frequency divider 14. FIG. 16(g) shows an output pulse signal Mb corresponding to the polygonal line b1. The first operating interval of the signal Mb is subjected to operation at the frequency f1 based on the reference frequency division ratio of the variable frequency divider 14. The second operating interval of the signal Mb is subjected to operation at the frequency f2(b) based on the frequency division ratio set by the ROM 18. FIG. 16(h) shows an output pulse signal Mc corresponding to the polygonal line c1. The first operating interval of the signal Mc is subjected to operation at the frequency f1 based on the reference frequency division ratio, but the second operating interval thereof is subjected to operation at the frequency f2(c) based on the frequency division ratio set by the ROM 18. The relationship between the frequencies f1, f2, f2(b) and f2(c) is determined to be f2(c)<f1<f2(b) such that the frequency division ratio set in the ROM 18 is small for the curve b and large for the curve c with reference to the reference frequency division ratio.

The operation of thermistor thermometers respectively with thermistors of the temperature sensitivity characteristic curves a, b and c in the temperature range above the reference temperature T0 will be described hereinafter.

In the case of the thermometer having the thermistor of the reference temperature sensitivity characteristic curve a, sensitivity correction need not be performed, and the frequency division ratio need not be updated in the ROM 18. The variable frequency divider 14 is always operated at the reference frequency division ratio.

When a temperature measurement is started at the temperature T1 of FIG. 13, the AND gate 12 is enabled in response to the measuring time signal Pt(a) from the gate counter 13, as shown in FIG. 16(b). At the same time, the ROM 18 is initialized, and the variable frequency divider 14 is operated at the reference frequency division ratio. An output pulse signal N gated through the AND gate 12 which receives the oscillation signal f0(a) from the temperature sensitive oscillator 11 is linearized as a count signal S by the temperature counter 16. In this case, the temperature counter 16 is started.

As shown in FIG. 16(f), the output pulse signal Ma from the variable frequency divider 14 is counted by the gate counter 13 at the reference frequency-divided frequency f1. When the count of the temperature counter 16 reaches S0 corresponding to the reference value N0, the temperature counter 16 generates the reference count signal Pn0(a) shown in FIG. 16(e), so that the ROM 18 is switched in the correction value setting state. The variable frequency divider 14 is thus operated at the set frequency division ratio. As shown in FIG. 16(b), the above operation corresponds to the first operating interval t1(a). Upon switching in response to the reference count signal Pn0(a), the first operating interval t1 is switched to the second operating interval t2. As described above, since frequency division ratio for sensitivity correction is not set in the ROM 18, the variable frequency divider 14 is kept operated at the reference frequency division ratio. The frequency divider 14 generates the signal f1 as the output pulse signal Ma. When the gate counter 13 counts the predetermined number G of pulses which is determined by the number of stages of the gate counter 13, the measuring time signal Pt(a) shown in FIG. 16(b) is disabled, the AND gate 12 is disabled, and one measurement cycle is completed.

The above operation will be described with reference to to FIG. 14. The first operating interval t1(a) of the measuring time signal Pt(a) of FIG. 16(b) is the count interval for the reference value N0 of the temperature counter 16, and the second operating interval t2(a) is the count interval between the reference value N0 and the end value Na. Therefore, when the temperature counter 16 counts the number Na of pulses, it generates the count S1.

Sensitivity correction is not required for the thermistor of the reference temperature sensitivity characteristic curve a. As shown in FIGS. 16(b) and 16(f), the sampling period t(a) constituted by the first and second operating intervals t1(a) and t2(a) is determined by the output pulse signal Ma having the reference frequency f1 of the same rate. The period t(a) is the reference sampling period.

When the thermometer incorporating a thermistor of positively deviated sensitivity given by the curve b is used, a frequency division ratio smaller than the reference frequency division ratio is set in the frequency division ratio convertion ROM 18, as described above.

In this case, as shown in FIGS. 16(c) and 16(g), the characteristic curve in the first operating interval t1(b) is the same as the curve a until the interval t1(b) ends. Thereafter, since the oscillation frequency f0 of the temperature sensitive oscillator 11 has a higher frequency than that given by the curve a, the counting timing of the temperature counter 16 for counting the reference value N0 is set to be earlier. As shown in FIG. 16(e), the reference count signal Pn0(b) is generated earlier than the signal Pn0(a), so that the first operating interval t1(b) is shorter than the interval t1(a). When the ROM 18 is switched in response to the reference count signal Pn0(b) and the variable frequency divider 14 has a frequency division ratio smaller than the reference one, the output pulse signal Mb during the second operating interval t2(b) has the higher frequency f2(b).

When the frequency of the output pulse signal Mb is increased, the pulse number G counting time of the gate counter 13 is shortened. As shown in FIGS. 16(b) and 16(c), the sampling period t(b) of the measuring time signal Pt(b) is shortened by Δt1 as compared with the reference sampling period t(a).

The above operation will be described with reference to FIG. 14. The oscillation signal f0(b) from the temperature sensitive oscillator 11 with the curve b has a higher frequency than that of the oscillation signal f0(a) represented by the curve a. The number of pulses generated during the reference sampling period t(a) is Nb. By shortening the sampling period t(b) by Δt1 from t(a), the number of pulses supplied to the temperature counter 16 can be decreased to Na, thereby obtaining the count S1 given by the curve a. As shown in FIG. 16(c) and 16(g), the first and second intervals t1(b) and t2(b) are subjected to operations by signals f1 and f2(b) having different count rates, thereby changing the sampling period t(b) of the measuring time signal Pt(b) and hence performing sensitivity correction. The above sensitivity correction is performed for all counts including the counts S2, S3 and S4 of FIG. 14. The polygonal line b1 completely matches with the polygonal line a1.

When the thermistor of negatively deviated sensitivity given by the curve c is used, a frequency division ratio larger than the reference frequency division ratio is set in the ROM 18. As shown in FIGS. 16(d) and 16(h), the sampling time t(c) is increased by Δt2 from the reference sampling period t(a).

Figure 14:
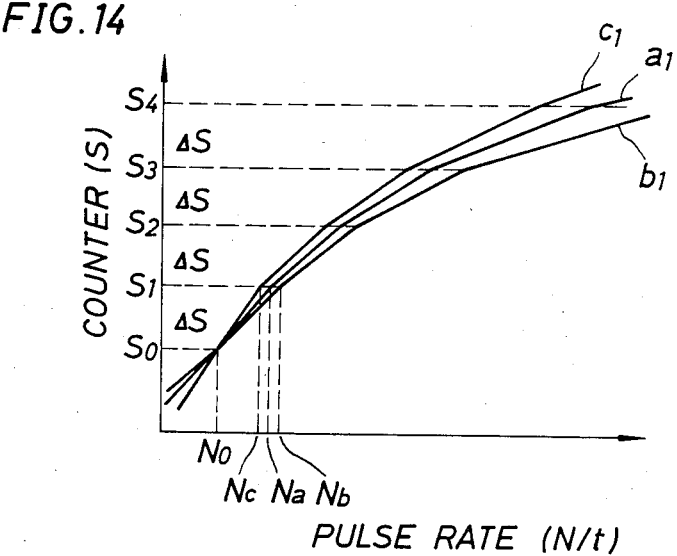

The oscillation signal f0(c) from the temperature sensitivie oscillator 11, as indicated by the curve c of FIG. 14, has a lower frequency than that of the oscillation signal f0(a) of the curve a, so that the number of pulses generated during the reference sampling period t(a) is Nc. However, by increasing the sampling period t(c) by Δt2 from the period t(a), the number of pulses supplied to the temperature counter 16 is increased to Na, thereby obtaining the same count S1 as in the curve a.

Figure 4:
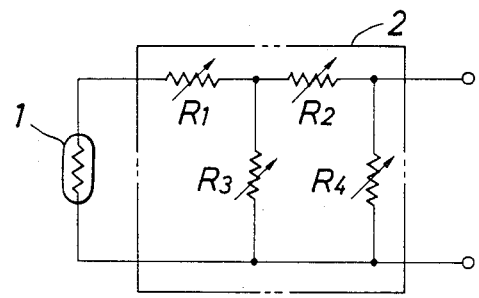
FIGS. 4 and 5 are respectively a circuit diagram and a block diagram for explaining conventional techniques for correcting variations in temperature sensitivity characteristics which are caused by different B constants of the conventional thermistor thermometers.
Figure 5:
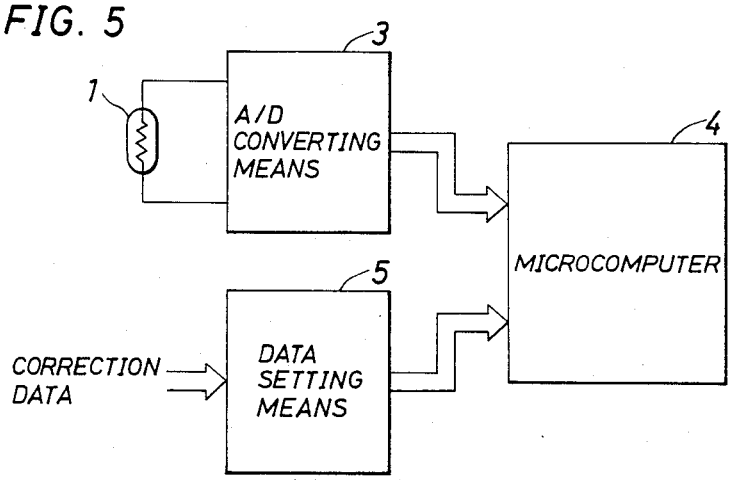
Figure 6:
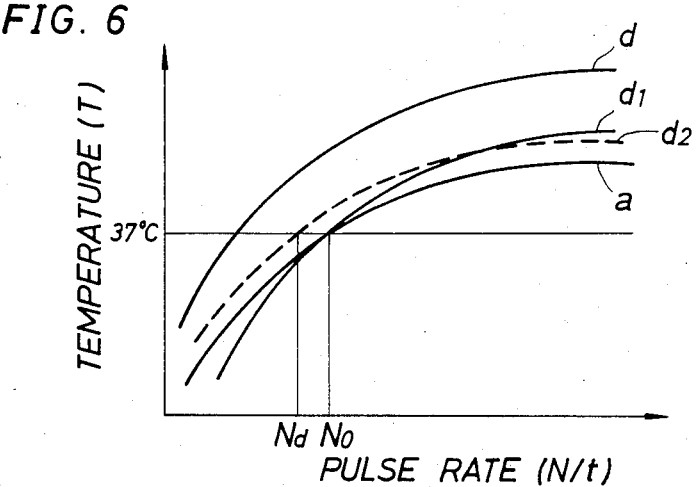
FIG. 6 is a graph showing temperature sensitivity characteristics of still another conventional thermistor thermometer.
Figure 17:
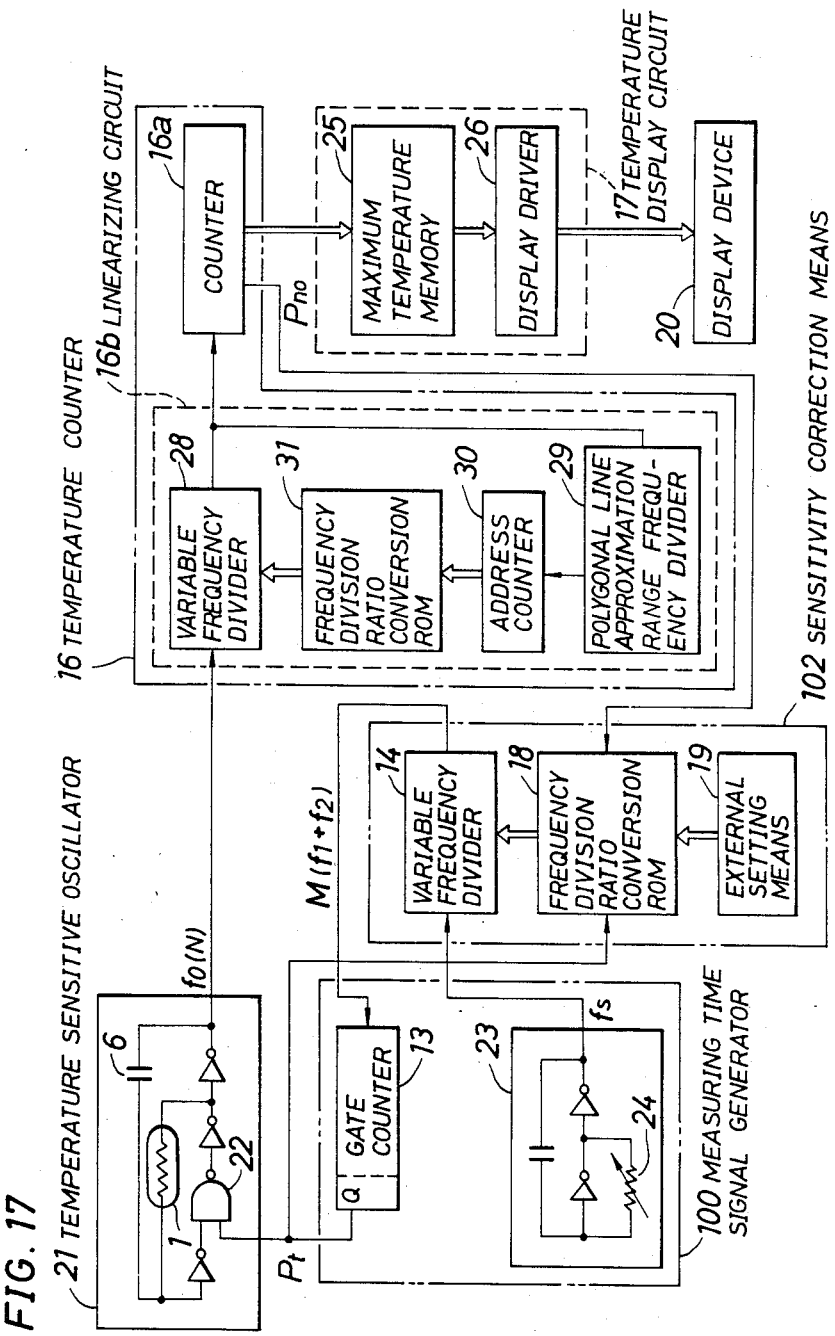
FIG. 17 is a block diagram of a thermistor thermometer according to still another embodiment of the present invention.

FIG. 17 shows still another embodiment. The arrangement of FIG. 17 is basically the same as that of FIG. 15. However, the reference resistance correction is performed by a variable resistor 24 arranged in the reference signal generator 15. A linearizing circuit 16b of FIG. 4 is arranged in the temperature counter 16.

According to the present invention, the sampling period of the temperature measurement is divided into the first and second operating intervals subjected to operations at different count rates. At the same time, reference resistance correction is performed during the first operating interval, and sensitivity correction is performed during the second operating interval. The reference resistance and the B constant which cause variations in the thermistor temperature sensitivity characteristics can be independently adjusted. The characteristic matching operation in the mass production lines of the thermistor thermometers can be greatly simplified.

Since the reference temperature T0 at which the first and second operating intervals are switched over is set near the lower limit of the possible operating temperature range, sensitivity correction is performed only for the necessary operation temperature range. Furthermore, the correction direction in sensitivity correction can be either negative or positive, so that the arrangement of the correction circuit can be simplified. Furthermore, by adding a linearizing circuit to a thermistor thermometer, thermistor thermometers of high temperature measurement precision and small "variations" in characteristics can be manufactured at low cost in mass production lines.

What is claimed is:

1. A thermometer having a temperature sensitive oscillator with a variable oscillation frequency which changes in response to a change in resistance of a thermistor, a measuring time signal generator for generating a measuring time signal for sampling and outputting the oscillation signal from said temperature sensitive oscillator, a temperature counter for counting oscillation pulses sampled by the measuring time signal and generating temperature data, a display driver for converting the temperature data to a display signal, and a display device for displaying a temperature in accordance with the display signal, wherein there are provided reference resistance correcting means for controlling to a predetermined reference value the number of oscillation pulses sampled by the measuring time signal at a reference temperature, the reference temperature being given as a constant temperature below a possible operating temperature range, and sensitivity correcting means for causing the thermometer to operate with different counting rates during first and second operating intervals constituting the sampling period of the measuring time signal, switching between the first and second operating intervals of said sensitivity correcting means being controlled in response to a reference count signal.

2. A thermometer according to claim 1, wherein said temperature counter has a linearizing circuit coupled to a counter for correcting nonlinear characteristics of the thermistor.

3. A thermometer according to claim 1, wherein said sensitivity correcting means comprises a variable frequency divider for dividing a frequency of the oscillation signal from said temperature sensitive oscillator, frequency division ratio conversion storage means for changing a frequency division ratio of said variable frequency divider, and external setting means for setting frequency division ratio data corresponding to a sensitivity of the thermistor in said frequency division ratio conversion storage means.

4. A thermometer according to claim 1, wherein said measuring time signal generator comprises a time reference signal generator for generating a time reference signal, and a gate counter for counting the time reference signal and generating a measuring time signal.

5. A thermometer according to claim 4, wherein said reference resistance correcting means comprises time width adjusting means for the measuring time signal.

6. A thermometer according to claim 5, wherein said time width adjusting means comprises a frequency adjusting variable resistor arranged in said time reference signal generator.

7. A thermometer according to claim 4, wherein said sensitivity correcting means comprises a variable frequency divider arranged between said time reference signal generator and a gate counter, frequency division ratio conversion storage means for changing a frequency division ratio of said variable frequency divider, and external setting means for setting frequency division ratio data corresponding to a sensitivity of the thermistor in said frequency division frequency ratio conversion storage means.

* * * * *